April 8, 1941.  G. C. WATSON  2,237,855
SPINDLE MOUNTING FOR TRUCKS
Filed April 5, 1940
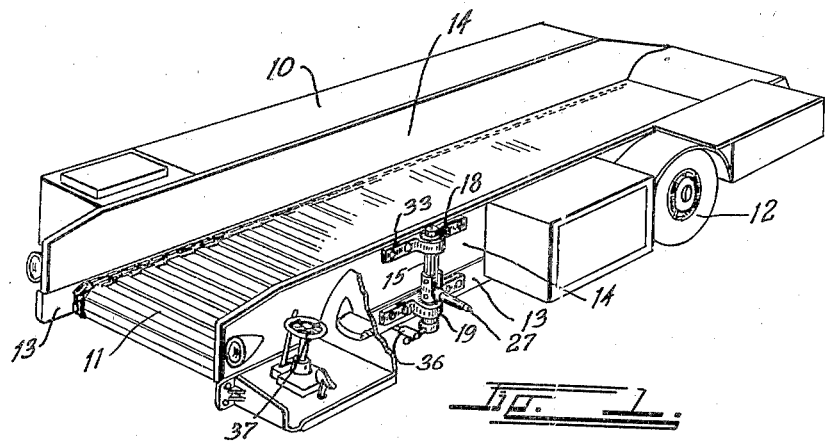
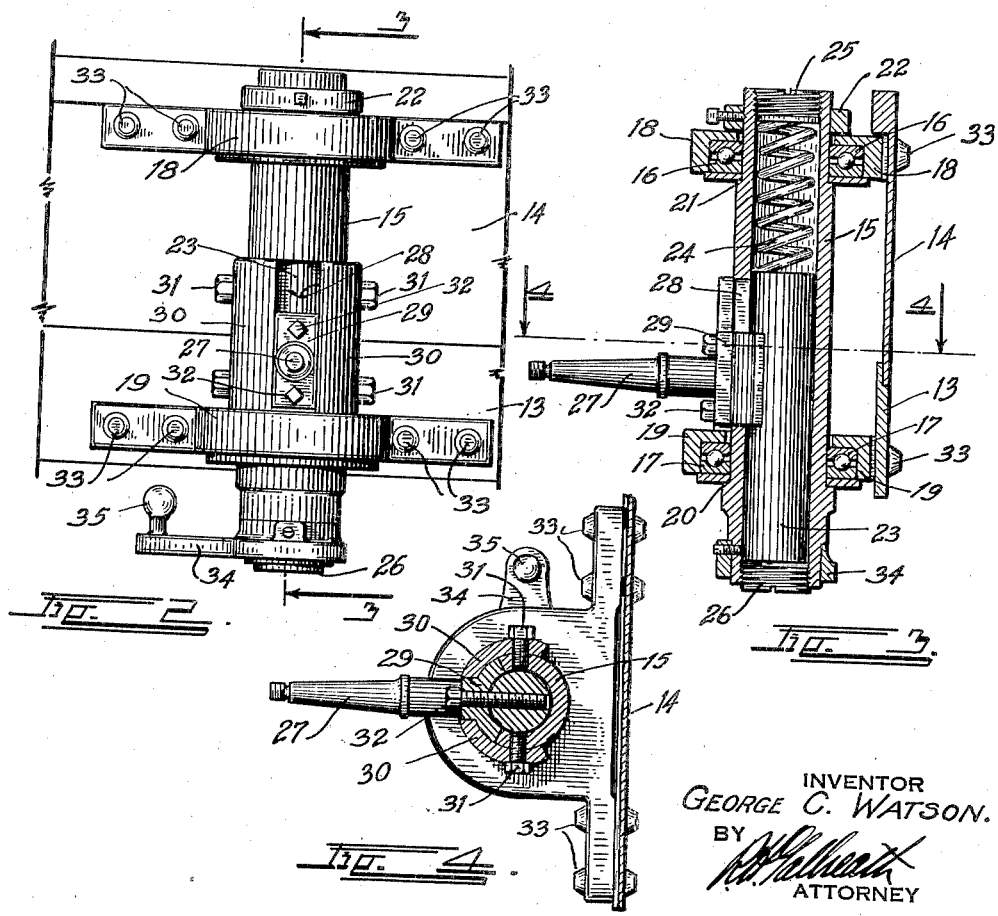
INVENTOR
GEORGE C. WATSON.
BY
ATTORNEY Patented Apr. 8, 1941

2,237,855

UNITED STATES PATENT OFFICE 2,237,855

SPINDLE MOUNTING FOR TRUCKS

George C. Watson, Denver, Colo.

Application April 5, 1940, Serial No. 327,987

2 Claims. (Cl. 280—96.2)

This invention relates to a wheel mounting for vehicles and more particularly for coal mine vehicles or other vehicles which must be built exceedingly low and with very little ground clearance.

The invention is more particularly designed for use on what are known as coal mine "shuttle cars," that is, the type of rubber tired truck provided with a conveyor bottom for carrying coal from the rooms to the main haulageways. Such vehicles are designed for carrying exceedingly heavy loads, from six to ten tons per truck. Their total heighth cannot exceed the diameter of the wheels and their beds have a road clearance of not over eight inches. For these reasons and due to the presence of the conveyor, it is impossible to place a sprung axle across the vehicles. It has also been impossible to place any springs between the wheels and vehicle due to the low clearance.

The principal object of this invention is to provide a resilient wheel spindle mounting, more particularly for mounting the front or guide wheels of such a vehicle, which will resiliently support the body from the wheels; which will not require a transverse axle; and which will not increase the heighth of the vehicle or decrease its road clearance.

While the invention is more particularly designed for use as the king pin on the front or steering wheels, it is not, of course, limited to this particular use but could also be applied to the rear or drive wheels of the vehicle.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 is a perspective view of a typical pneumatic tired shuttle car with the left front wheel removed to illustrate the improved king pin mounting in place therein.

Fig. 2 is a side view of the improved mounting with the wheel removed.

Fig. 3 is a vertical section, taken on the line 3—3, Fig. 2.

Fig. 4 is a horizontal section, taken on the line 4—4, Fig. 3.

In the drawing a typical coal mine shuttle car is illustrated at 10 with its conveyor bottom at 11, its drive wheels at 12, its chassis frame at 13, and with its longitudinal side members at 14.

The improved resilient wheel spindle mounting employs a vertical tube 15 supported in upper and lower thrust bearings 16 and 17, respectively, the bearings are carried in upper and lower bracket members 18 and 19, respectively, designed to be secured to the vehicle in any desired manner. As illustrated, the upper bracket member 18 is secured to the longitudinal side members 14 of the shuttle car and the lower bracket members 19 are secured to the chassis frame 13 thereof.

The tube 15 is formed with a lower shoulder 20 for supporting the thrust of the lower bearing 17 and an upper shoulder 21 for supporting the thrust from the upper bearing 16. The tube is prevented from falling from place, should the vehicle be lifted, by means of a set collar 22 above the upper bracket member 18.

An elongated piston 23 is slidably fitted into the tube 15 and is constantly urged downwardly therein by means of a compression spring 24. The spring is compressed between the head of the piston 23 and a top plug member 25 in the tube. The bottom of the tube is closed by means of a bottom plug 26.

A wheel spindle 27 for carrying a front vehicle wheel projects outwardly from the piston 23 through a vertical slot 28 in the side of the tube 15. The spindle is formed with a vertically elongated base 29 formed to partially surround one side of the piston 23 and ride against the vertical sides of the slot 28. This prevents rotation of the piston in the tube 15. To provide additional wearing surfaces to resist the rotation of the piston, two arcuate bearing members 30 are secured to the tube, there being one of these bearing members on each side of the base 29 of the wheel spindle 27. The bearing members 30 may be an integral part of the tube or may be secured thereto by means of cap screws 31. The sides of the base 29 ride against the vertical edges of the bearing members to prevent rotation of the spindle 27 about the tube 15. The spindle and its base may be formed as an integral part of the piston 23 or may be secured thereto by means of suitable attachment screws 32 as illustrated.

A steering arm 34 is formed on or secured to the lower extremity of the tube 15 and projects forwardly therefrom terminating in a bearing post 35 for receiving the universal socket of a steering cross rod 36 with which the vehicle is provided and which is operated from a suitable steering wheel 37 at the operator's position.

It can be readily seen that the wheel of the vehicle supports the piston 23 in fixed position above the ground surface and that the entire weight of the vehicle is carried by the bracket members 18 and 19 to the tube 15 and from thence through the spring 24 to the piston 23. All steering of the vehicle is done by rotating the tube 15 in its bearings 16 and 17.

If the device is to be on wheels not required for steering, the bearings 16 and 17 could be eliminated and the tube supported directly in its brackets 18 and 19.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A resilient king pin for vehicles comprising: a vertical tube; a piston vertically movable in said tube; a wheel spindle projecting outwardly from said piston through a vertically elongated slot in said tube; a compression spring for resisting downward movement of said tube on said piston; bracket members for supporting said tube from a vehicle; annular bearings in said bracket members, said tube extending through said bearings; means for preventing vertical movement of said bearings on said tube; and means for rotating said tube about its vertical axis.

2. A resilient king pin for vehicles comprising: a vertical tube; a piston vertically movable in said tube; a wheel spindle projecting outward from said piston through a vertically elongated slot in said tube; a compression spring for resisting downward movement of said tube on said piston; bracket members for supporting said tube from a vehicle; thrust bearings mounting said tube in said bracket members; means for rotating said tube about its vertical axis; and vertical guide members at each side of said wheel spindle to prevent rotation of said tube on said piston.

GEORGE C. WATSON.